United States Patent [19]

Wu

[11] Patent Number: 5,803,853
[45] Date of Patent: Sep. 8, 1998

[54] BICYCLE DRIVE CHAIN

[75] Inventor: Nick Wu, Tainan, Taiwan

[73] Assignee: KMC Chain Industrial Co., Ltd., Taiwan

[21] Appl. No.: 885,300

[22] Filed: Jun. 30, 1997

[51] Int. Cl.⁶ .............................. F16G 13/02; F16H 55/00
[52] U.S. Cl. ............................................ 474/206; 474/160
[58] Field of Search ...................... 474/160, 164, 474/158, 155, 156, 206, 226, 231

[56] References Cited

U.S. PATENT DOCUMENTS

| | | | |
|---|---|---|---|
| 2,162,042 | 6/1939 | Welser | 474/156 |
| 4,047,603 | 9/1977 | Ozaki | 474/156 X |
| 4,642,078 | 2/1987 | Dupoyet | 474/206 |
| 5,098,349 | 3/1992 | Wu | 474/226 X |

FOREIGN PATENT DOCUMENTS 607095  7/1994  European Pat. Off. ............... 474/160

*Primary Examiner*—Thomas R. Hannon
*Attorney, Agent, or Firm*—Harness, Dickey & Pierce, P.L.C.

[57] ABSTRACT

A bicycle drive chain is provided for training on a rear speed changing gear assembly having up to nine concentric sprocket wheels. Each of the sprocket wheels has a thickness of about 1.8 mm. An outermost one of the sprocket wheels has an outer face that is displaced from an inner face of an innermost one of the sprocket wheels by a distance not greater than 37 mm. The bicycle drive chain includes inner and outer chain plates, pins for connecting the inner and outer chain plates, and rollers provided respectively on the pins for spacing apart the inner chain plates. The bicycle drive chain has a pitch defined by distance between axes of two adjacent ones of the pins and equal to about 12.7 mm. The pitch is 1.924±0.060 times a total thickness of the bicycle drive chain.

1 Claim, 4 Drawing Sheets

BICYCLE DRIVE CHAIN

BACKGROUND OF THE INVENTION

1. Field of the Invention

The present invention relates to a bicycle drive chain, more particularly to a bicycle drive chain for training on a rear speed changing gear assembly having up to nine concentric sprocket wheels.

2. Description of the Related Art

A conventional bicycle transmission system includes a chain wheel, a free wheel and a drive chain trained on the chain wheel and the free wheel for driving the bicycle. Since the ratio of the teeth on the chain wheel with those on the free wheel is unchangeable, the bicycle can only be driven at a constant speed. Thus, it is relatively effort-consuming to drive the bicycle when the bicycle is moving forward on an upward slope.

Various types of bicycles having speed changing gear-shifting mechanisms have been developed to solve the above problem. An example of the speed changeable bicycles generally includes a front speed changing gear assembly with a plurality of concentric sprocket wheels, a rear speed changing gear assembly with a plurality of concentric sprocket wheels, and a drive chain trained on the front and rear speed changing gears for driving the same. Up to now, the conventional speed changeable bicycle can include up to three front speed changing gears and up to eight rear speed changing gears. Thus, the speed of the bicycle can be shifted among 3×8=24 gear ratios.

At present, the number of the sprocket wheels of the front speed changing gear assembly is limited to a maximum of three due to the distance between two crank arms of the bicycle. On the other hand, the number of the sprocket wheels of the rear speed changing gear assembly is limited to a maximum of eight due to the fact that the weight center of the bicycle will deviate so that the bicycle is not easy to balance when the distance of an outer face of an outermost one of the sprocket wheels from an inner face of an innermost one of the sprocket wheels exceeds 37 mm. Therefore, the eight sprocket wheels of a conventional rear speed changing gear assembly are arranged in a manner as shown in FIG. 1. The conventional rear speed changing gear assembly 1 includes eight concentric sprocket wheels 12, each of which has a thickness of 1.8 mm and is spaced from an adjacent one of the sprocket wheels 12 on the axle 11 by a distance of 3.0 mm. The distance between the outer face of an outermost one of the sprocket wheels 12 and the inner face of an innermost one of the sprocket wheels 13 is (1.8 mm×8)+(3.0 mm ×7)=35.4 mm, which is smaller than 37 mm. Since the bicycle drive chain engages one of the sprocket wheels 12 at one time, the space provided on the rear speed changing gear assembly 1 for accommodating the bicycle drive chain when it is shifted so as to engage a selected one of the sprocket wheels 12 is 3.0 mm+1.8 mm+3.0 mm=7.8 mm, which is the maximum total thickness of the bicycle drive chain that can be trained on the gear assembly 1.

FIG. 2 illustrates a side view of a conventional bicycle drive chain 2 to be used with the aforementioned rear speed changing gear assembly 1. The conventional bicycle chain 2 includes outer chain plates 21, inner chain plates 22, pins 24 for connecting the inner and outer chain plates 22, 21, and rollers 23 provided respectively on the pins 24 for spacing apart the inner chain plates 22. To meet the aforementioned thickness requirements, the inner chain plates 22 have a thickness of about 1.1 mm. The outer chain plates 21 have a thickness of about 1.0 mm. The distance between each of the inner chain plates 22 and an adjacent one of the outer chain plates 21 is about 0.15 mm. The rollers 23 have a thickness of about 2.2 mm. Each of the pins 24 has two opposite ends that protrude relative to an adjacent one of the outer chain plates 21 by a distance of about 0.3 mm. The distance between axes 241 of two adjacent pins 24, i.e., the pitch 25 of the bicycle drive chain 2, conforms with the distance 122 between two adjacent teeth of a selected one of the sprocket wheels 12 of the rear speed changing gear assembly 1 (see FIG. 1) and is about 12.7 mm. Accordingly, the bicycle drive chain 2 has a total thickness 20 of 0.3 mm+1.0 mm+0.15 mm+1.1 mm+2.2 mm+1.1 mm+0.15 mm+1.0 mm+0.3 mm=7.3 mm. Thus, the bicycle drive chain 2 has a ratio of the pitch 25 to the thickness 20 of 12.7 mm/7.3 mm=1.74/1. As such, when the bicycle drive chain 2 engages a selected one of the sprocket wheels 12 of the rear speed changing gear assembly 1, it can be spaced apart from the adjacent sprocket wheels 12. Interference caused by the adjacent sprocket wheels 12 can thus be avoided. The drive chain 2 can be freely and smoothly trained on the rear speed changing gear assembly 1 and can be shifted smoothly from one of the sprocket wheels 12 to another.

Since the conventional bicycle drive chain 2 has a predetermined pitch/total thickness ratio, it can only be used for training on a rear speed changing gear assembly having up to eight sprocket wheels. If an additional sprocket wheel is to be provided on the rear speed changing gear assembly, the distance between the outer face of the outermost sprocket wheel 12 from the inner face of the innermost sprocket wheel 12 will increase by 3.0 mm+1.8 mm=4.8 mm, and will become 35.4+4.8=40.2 mm, which is greater than 37 mm, thereby causing deviation of the weight center of the bicycle. Thus, if the design of the gear assembly is changed so as to accommodate up to nine sprocket wheels 12 without exceeding the 37 mm limit, the conventional bicycle drive chain will not be suitable for use therewith.

SUMMARY OF THE INVENTION

The main object of the present invention is to provide a bicycle drive chain for training on a rear speed changing gear assembly having up to nine concentric sprocket wheels.

Accordingly, the bicycle drive chain of the present invention is adapted for training on a rear speed changing gear assembly having up to nine concentric sprocket wheels. Each of the sprocket wheels has a thickness of about 1.8 mm. An outermost one of the sprocket wheels has an outer face that is displaced from an inner face of an innermost one of the sprocket wheels by a distance not greater than 37 mm. The bicycle drive chain includes inner and outer chain plates, pins for connecting the inner and outer chain plates, and rollers provided respectively on the pins for spacing apart the inner chain plates. The bicycle drive chain has a pitch defined by distance between axes of two adjacent ones of the pins and equal to about 12.7 mm. The pitch is 1.924±0.060 times a total thickness of the bicycle drive chain.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
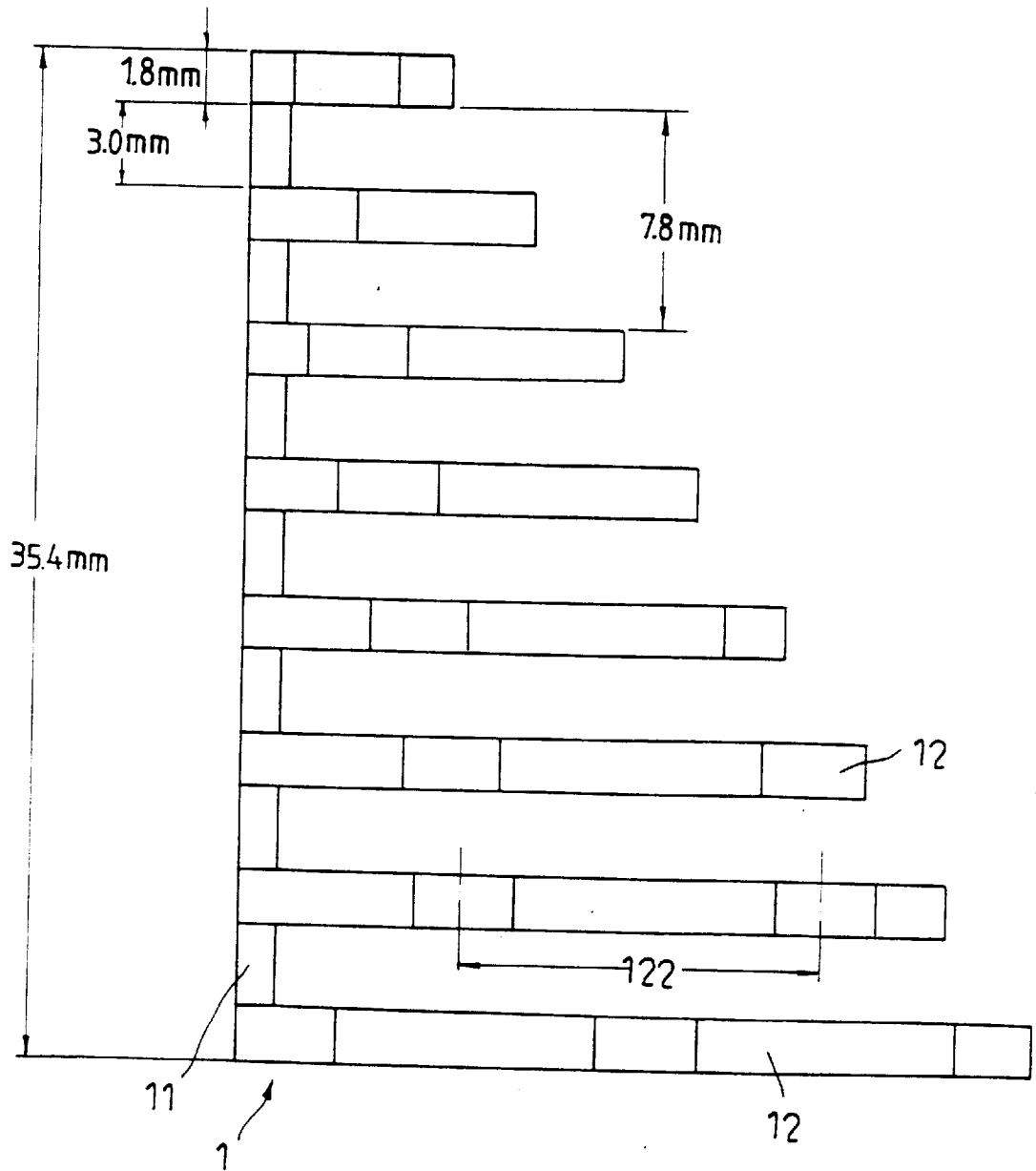
FIG. 1 illustrates the specifications of a conventional rear speed changing gear assembly with eight sprocket wheels.
Figure 2:
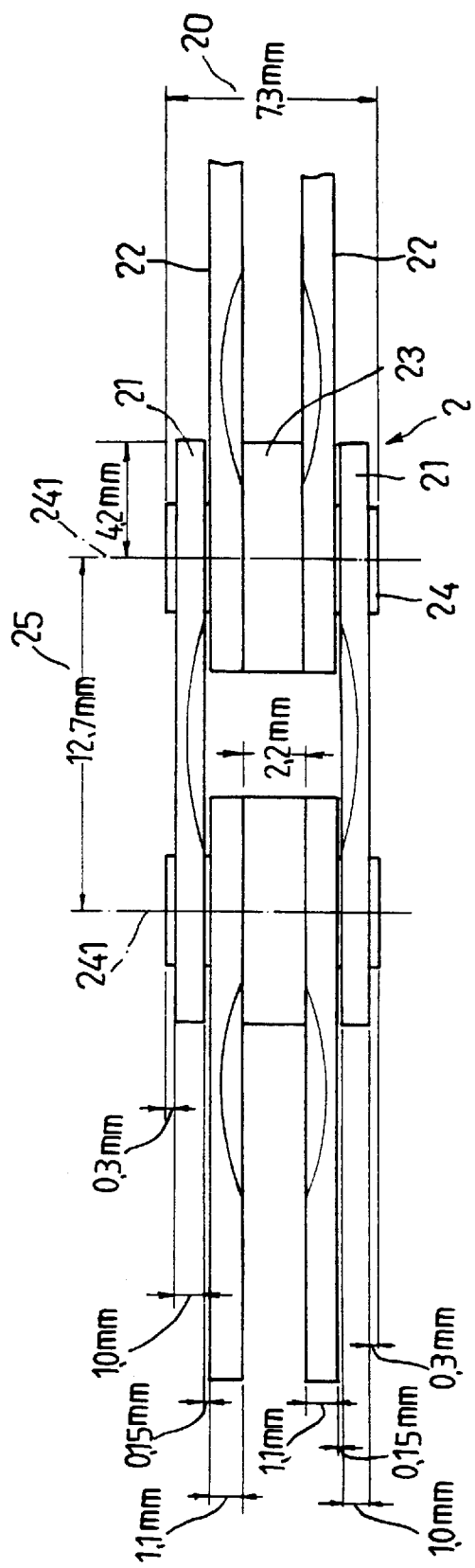
FIG. 2 is a side view of a conventional bicycle drive chain for the gear assembly of FIG. 1.
Figure 3:
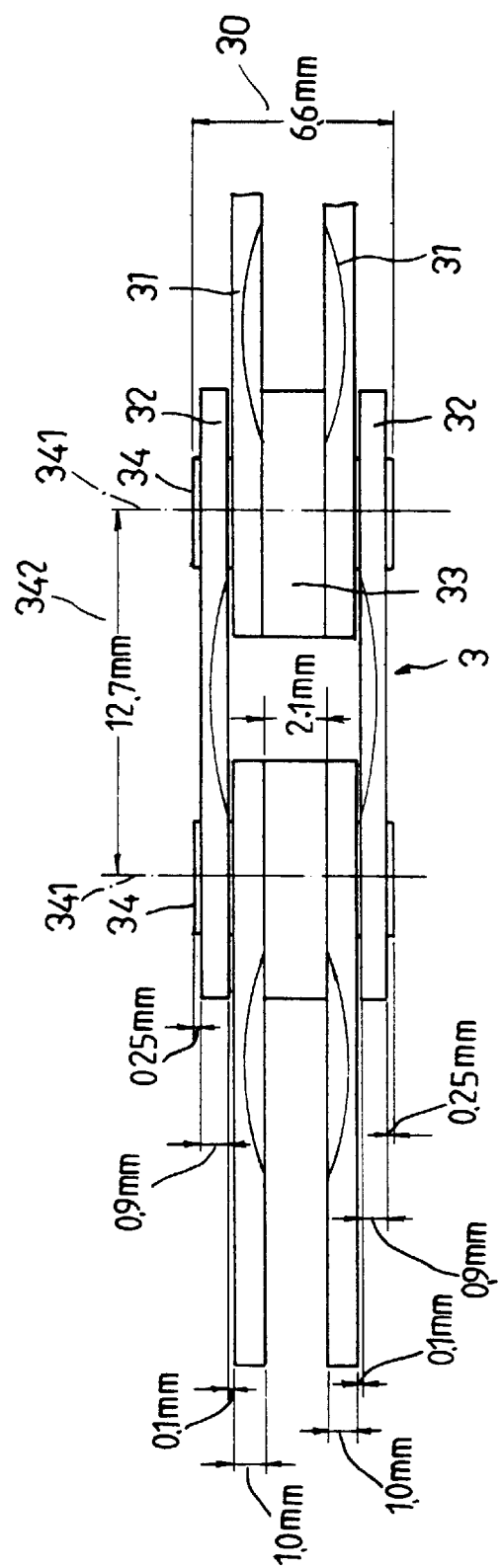
FIG. 3 is a side view of a bicycle drive chain according to a preferred embodiment of the present invention.

Referring to FIG. 3, the bicycle drive chain 3 according to the preferred embodiment includes inner and outer chain plates 31, 32, pins 34 for connecting the inner and outer chain plates 31, 32, and rollers 33 provided respectively on the pins 34 for spacing apart the inner chain plates 31. The bicycle drive chain 3 has a pitch 342 which is defined by the distance between axes 341 of two adjacent ones of the pins 34 and which is 12.7 mm as in the conventional bicycle drive chain 2 described beforehand. The bicycle drive chain 3 of the present embodiment has the following specifications:

(1) Thickness of the outer chain plates 32: 0.9 mm.

(2) Thickness of the inner chain plates 31: 1.0 mm.

(3) Space between adjacent inner and outer chain plates: 0.1 mm (4) Axial length of the rollers: 2.1 mm (5) Space between ends of the pins 34 and the adjacent one of the outer chain plates 32: 0.25 mm.

Accordingly, the bicycle drive chain 3 has a total thickness of: 0.25 mm+0.9 mm+0.1 mm+1.0 mm+2.1 mm+1.0 mm+0.1 mm+0.9 mm+0.25 mm=6.6 mm. The pitch 342 is 12.7 mm/6.6 mm=1.924 times the total thickness 30 of the bicycle drive chain 3. It has been found that the bicycle drive chain 3 can be used for training on a rear speed changing gear assembly having up to nine sprocket wheels, as shown in FIG. 4.

Figure 4:
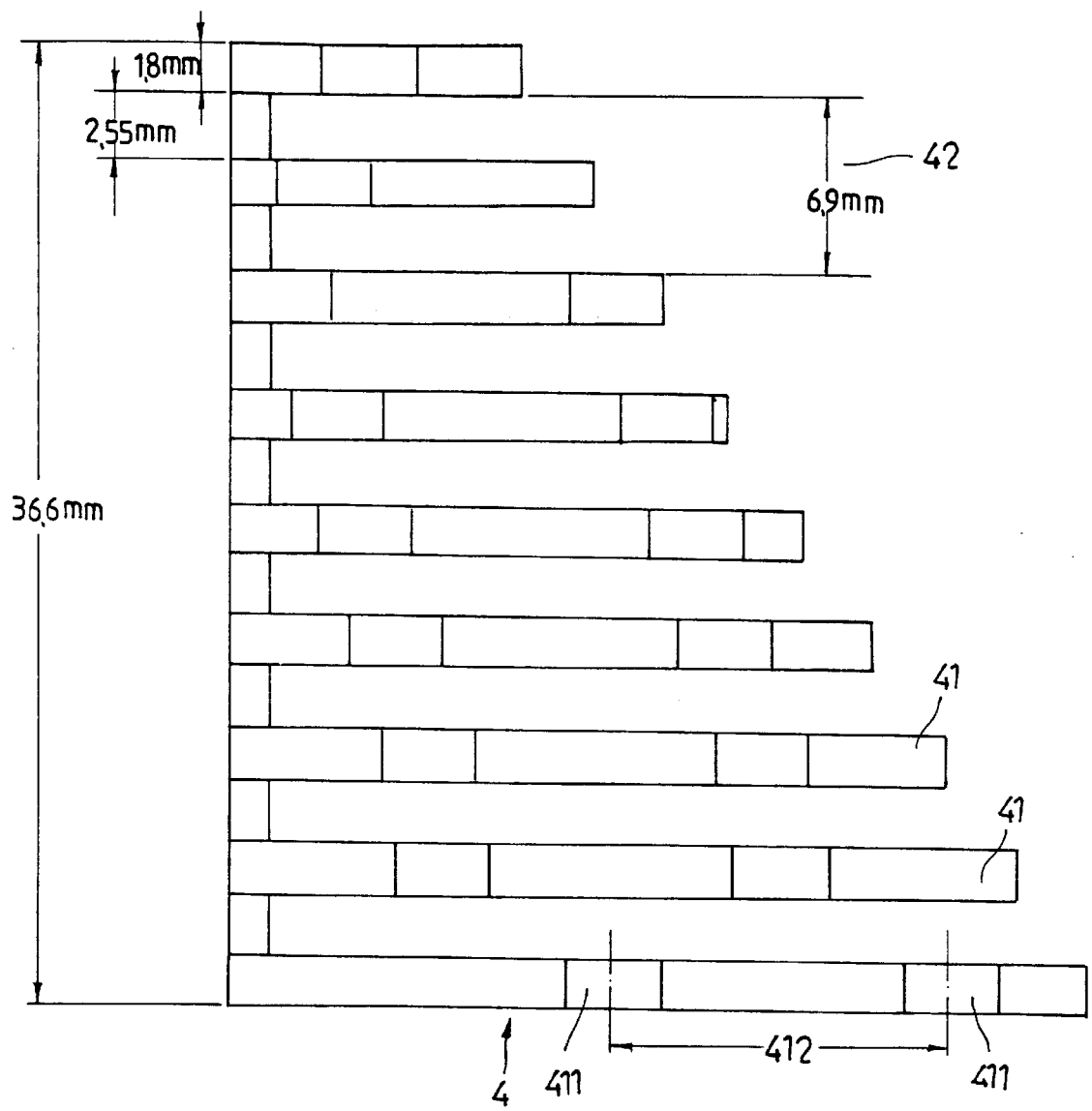
FIG. 4 illustrates the specifications of a rear speed changing gear assembly having nine sprocket wheels which can be applied with the bicycle drive chain of this invention.

Referring to FIG. 4, the rear speed changing gear assembly 4 includes nine sprocket wheels 41, each of which is formed with teeth 411 on the periphery thereof. The distance between two adjacent ones of the teeth 411 of each of the sprocket wheels 41 is equal to the distance between axes 341 of two adjacent ones of the pins 34. Each of the sprocket wheels 41 has a thickness of about 1.8 mm. Since the total thickness 30 of the bicycle drive chain 3 has been reduced from 7.3 mm to 6.6 mm, a space of about 6.9 mm can be provided on the rear speed changing gear assembly 4, which is still sufficient for accommodating the bicycle drive chain 3 when it engages a selected one of the sprocket wheels 41. In the gear assembly 4, the space between two adjacent ones of the sprocket wheels 41 of the rear speed changing gear assembly 4 can be reduced to a value of (6.9−1.8)/2=2.55 mm. Thus, the space between an outer face of an outermost one of the sprocket wheels 41 and an inner face of an innermost one of the sprocket wheels 41 is: (1.8 mm×9)+(2.55 mm×8)=36.6 mm, which is smaller than 37 mm. Deviation of the weight center of the bicycle can be obviated.

In practice, the specifications of the bicycle drive chain are not limited to those in the preferred embodiment, as long as the total thickness of the bicycle drive chain is in the range of 6.4 mm to 6.8 mm. The bicycle drive chain which meets the requirement that the pitch thereof is 1.924±0.060 times the total thickness thereof can be used for training on a rear speed changing gear assembly having up to nine sprocket wheels in accordance with the present invention.

With this invention thus explained, it is apparent that numerous modifications and variations can be made without departing from the scope and spirit of this invention. It is therefore intended that this invention be limited only as indicated in the appended claims.

I claim:

1. A bicycle drive chain for training on a rear speed changing gear assembly having up to nine concentric sprocket wheels, each of the sprocket wheels having a thickness of about 1.8 mm, an outermost one of the sprocket wheels having an outer face that is displaced from an inner face of an innermost one of the sprocket wheels by a distance not greater than 37 mm, said bicycle drive chain comprising inner and outer chain plates, pins for connecting said inner and outer chain plates, and rollers provided respectively on said pins for spacing apart said inner chain plates, said bicycle drive chain having a pitch defined by distance between axes of two adjacent ones of said pins and equal to about 12.7 mm, wherein said pitch is 1.924±0.060 times a total thickness of said bicycle drive chain.

* * * * *